(12) United States Patent
Ebert et al.

(10) Patent No.: US 11,858,169 B2
(45) Date of Patent: Jan. 2, 2024

(54) METHOD FOR THE ADDITIVE MANUFACTURE OF SHAPED BODIES

(71) Applicants: Ivoclar Vivadent AG, Schaan (LI); Technische Universität Wien, Vienna (AT)

(72) Inventors: Jörg Ebert, Buchs SG (CH); Julia Anna Schönherr, Vienna (AT); Robert Gmeiner, Vienna (AT)

(73) Assignees: Ivoclar Vivadent AG, Schaan (LI); Technische Universität Wien, Vienna (AT)

( * ) Notice: Subject to any disclaimer, the term of this patent is extended or adjusted under 35 U.S.C. 154(b) by 525 days.

(21) Appl. No.: 16/679,584

(22) Filed: Nov. 11, 2019

(65) Prior Publication Data
US 2020/0171701 A1 Jun. 4, 2020

(30) Foreign Application Priority Data
Dec. 3, 2018 (EP) .................................... 18209713

(51) Int. Cl.
| | |
|---|---|
| B29C 64/124 | (2017.01) |
| B28B 1/00 | (2006.01) |
| B28B 17/00 | (2006.01) |
| C04B 35/64 | (2006.01) |
| B29C 64/40 | (2017.01) |
| B33Y 10/00 | (2015.01) |

(52) U.S. Cl.
CPC .......... *B28B 1/001* (2013.01); *B28B 17/0018* (2013.01); *B29C 64/124* (2017.08); *B29C 64/40* (2017.08); *C04B 35/64* (2013.01); *B33Y 10/00* (2014.12)

(58) Field of Classification Search
CPC ..... B28B 1/001; B28B 17/0018; C04B 35/64; B33Y 10/00
See application file for complete search history.

(56) References Cited

U.S. PATENT DOCUMENTS

| | | |
|---|---|---|
| 5,135,379 A | 8/1992 | Fudim |
| 5,216,616 A | 6/1993 | Masters |
| 5,386,500 A | 1/1995 | Pomerantz et al. |
| 9,067,359 B2 | 6/2015 | Rohner et al. |
| 2017/0232682 A1* | 8/2017 | Alcantara Marte ..... B22F 10/47 264/497 |
| 2018/0036205 A1* | 2/2018 | Wilsher ................. G09B 21/00 |
| 2021/0229315 A1* | 7/2021 | Lee ......................... B28B 1/001 |

* cited by examiner

*Primary Examiner* — Yung-Sheng M Tsui
(74) *Attorney, Agent, or Firm* — Ann M. Knab; Thad McMurray

(57) ABSTRACT

The present invention relates to a method for producing shaped bodies (5) from a building material, in which a layered structure of a shaped body (5) takes place by successively solidifying layers of the building material by exposure to electromagnetic radiation in a layer area having a contour specified for the respective layer. The method provides that together with the shaped body (5), a sleeve-like frame (6) surrounding the shaped body at a distance is constructed layer by layer from the building material, and that in addition, a plurality of pin-like connections (10) are constructed integral with the frame (6) and the shaped body (5), which are distributed around the shaped body (5) and which connect the shaped body (5) with the frame (6).

17 Claims, 3 Drawing Sheets

METHOD FOR THE ADDITIVE MANUFACTURE OF SHAPED BODIES

CROSS-REFERENCE TO RELATED APPLICATIONS

Figure 1A:
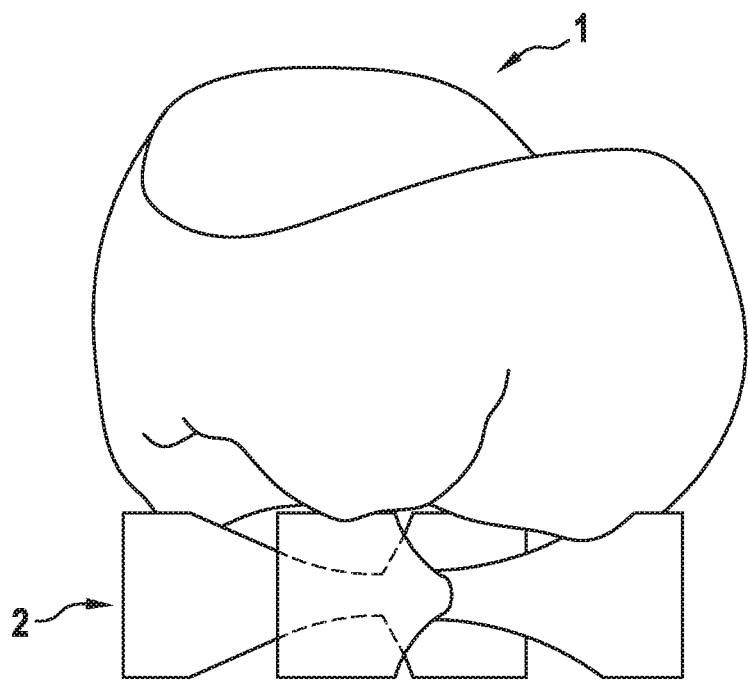

This application claims priority to European patent application No. 18209713.9 filed on Dec. 3, 2018, the disclosure of which is incorporated herein by reference in its entirety.

TECHNICAL FIELD

The present invention relates to a method for producing shaped bodies from a building material, in particular from slurry filled with ceramic, by means of an additive manufacturing method, in which during a construction process, a layered structure of a shaped body takes place by successively solidifying layers of the building material through exposure to electromagnetic radiation in a layer area having a contour specified for the respective layer.

BACKGROUND

The layer-wise or continuous building process of shaped bodies is one of the construction methods which fall under the generic term generative manufacturing or additive manufacturing. This is understood to mean a class of methods in which a three-dimensional object (shaped body) is constructed directly on the basis of a digital model of the shaped body (for example, a CAD model). For this, in the layer-wise building, the digital model of the shaped body is subdivided into a plurality of successive thin slices, wherein each slice has a contour defined by the model. The building/construction process is performed by adding layers of material, wherein each layer is processed to produce the contour specified by the digital model for that layer. Finally, the stack of superimposed interconnected layers forms the shaped body, which is further processed in some methods, for example, by heat treatments for debinding and sintering.

The term "contour" is commonly used in the context of the present invention and is not limited to a simple closed boundary line that encloses a single contiguous area, but can include a plurality of separate contour sections that enclose adjacent separate areas which together form the respective layer, or there can be outer and inner contour sections that define annular areas of the layer.

The building material from which the shaped body is constructed is cured by electromagnetic radiation. It can contain, in addition to photopolymerizable polymer precursor compounds, fillers such as ceramic, glass ceramic or metal powder and optionally dispersants and other additives. The present invention is particularly directed to the production of ceramic or glass ceramic shaped bodies (so-called green bodies), such as dental inlays, onlays, veneers, crowns, bridges and scaffolds.

WO 2010/045950 A1 and corresponding U.S. Pat. No. 9,067,359, which is hereby incorporated by reference, disclose an example of a method for constructing a shaped body, which relates in particular to the structure of dental restorations made of ceramic slurries which contain a liquid photopolymerizable component and a filler made of ceramic or glass-ceramic powder distributed therein. In this known method, the shaped body is constructed successively by superposed cured layers. In this case, a construction platform is held vertically movable above a tank bottom, which is translucent, at least in the construction area. An exposure unit is located below the tank bottom. The construction platform is first lowered into the slurry in the tank until only one layer having the desired layer thickness remains between the construction platform and the tank bottom. Subsequently, this layer is exposed by the exposure unit with the contour specified by the digital model for this layer by the exposure unit and thereby cured. After lifting the construction platform, slurry, for example, with a doctor blade, is replenished from the surroundings and then the construction platform is again lowered in the slurry, wherein the lowering is controlled so that the distance between the last cured layer and the tank bottom defines a layer of building material having the desired thickness. The last steps are repeated until the shaped body having the desired three-dimensional shape is constructed by the successive curing (solidification) of layers with a respective contour specified by the digital model.

The shaped body can be removed with the construction platform after complete construction of the shaped body. As a rule, this is followed by further processing steps. In the method described above, a green body is produced by the layered polymerization of the building material. This is then heated to high temperatures to remove the binder, in this case photopolymer. This happens at high temperatures due to thermal decomposition and reactions that decompose the polymer into lighter molecules that diffuse to the surface and eventually escape as gases. This process of debinding can then be followed by a further heat treatment for further solidification in which the remaining ceramic particles are sintered in the shaped body.

In order to ensure stability in the construction process, support structures constructed from the building material are used in some manufacturing methods in order to fix the shaped body during manufacture and to support cantilevered layers and overhangs against gravity. Support structures are often also used to support process-related residual stresses occurring in some additive manufacturing methods. After the construction process is completed, the support structures must be accessible and as easy as possible to remove.

Process-related residual stresses are primarily the result of thermal influences on the shaped body. A number of additive manufacturing methods are associated with severe temperature fluctuations. Thus, a number of manufacturing methods provide debinding and sintering processes in which distortions can occur due to uneven cooling rates of the shaped body. Sintering distortion is a frequently observed phenomenon in the production of dense ceramic components. This is undesirable, especially in regions which require a high degree of accuracy. One example here is dental technology. A tooth crown in the form of the green body can be produced in the additive process, for example, by curing photoreactive slurry filled with ceramic powder, layer by layer, and the component acquires the desired three-dimensional shape. In the next step, the component is freed of slurry residues and any support structures that were necessary for structuring are removed. In the steps of thermal post-processing, the binders are first burned out during debinding and then the ceramic is densely sintered. This can lead to distortions of the shaped body due to technical reasons. However, the least possible distortion and a high accuracy of fit are essential for the connection of the tooth crown to the tooth stump.

The reliable fixation of the shaped body during the construction process or during subsequent processes thus contributes significantly to the accuracy and quality of the manufactured shaped body.

SUMMARY

It is therefore an object of the present invention to propose an improvement of the holding of the shaped body.

The object underlying the invention is achieved by a method having the features of claim 1.

Advantageous embodiments of the present invention are the subject of the dependent claims.

According to the invention, it is provided that, during the construction process, a sleeve-like frame surrounding the shaped body at a distance is constructed layer-wise from the building material together with the shaped body. This sleeve-like frame, which comprises a circumferential side wall in the manner of a sleeve, extends along a circumference of the shaped body, so that the shaped body is arranged within the sleeve-like frame. In addition, during the construction process, a plurality of pin-type connections is constructed integrally with the frame and the shaped body. These pin-like connections or webs are distributed around the shaped body and connect the frame and the shaped body to each other on different sides of the shaped body. The peripheral surface of the shaped body can be divided into a plurality of surface sections, for example, in the case of a prismatic frame, and the pin-like connections can be connected thereto along the circumference of the shaped body at different surface sections of the shaped body. Also, the inner peripheral surface of the frame can be divided into a plurality of inner wall sections, for example, in the case of a prismatic frame, and the pin-like connections can be formed on different inner wall sections of the frame.

The sleeve-like frame is preferably in the form of a cylinder open at the bases. Cylinder is here understood to mean a geometric body in which two parallel, planar, congruent bases are connected to each another by a jacket, wherein the bases themselves are open as stated. The contour of the bases can be any closed curve and is not limited to circular. The contour of the bases can also be closed polygons, wherein the resulting bodies in this case are also called prisms. The longitudinal axis of such frames is the cylinder axis.

Zones with pin-like connections can be uniformly provided at an angular distance of, for example, 90° about a longitudinal axis of the shaped body. The longitudinal axis of the shaped body runs in this sense in the same direction as the longitudinal axis of the frame. The longitudinal axis of the sleeve-like frame is a central axis that surrounds the frame. However, there are also other, primarily uneven angular distances between the pin-like connections. The arrangement of the pin-like connections is primarily dependent on the shape of the shaped body to be supported on different surfaces of its body.

In contrast to simple support structures, the integrally formed frame provides improved support for the shaped body during the construction process and subsequent manufacturing processes. Unlike simple support structures, which support the shaped body only from below, the frame offers the option of building a plurality of attachment points around the circumference of the shaped body, which points are connected thereto on different sides of the shaped body. The pin-like connections are formed such that the shaped body can be released from the frame by breaking the pin-like connections. The thickness of the pin-like connections can be dimensioned accordingly for this purpose.

Preferably, the pin-like connections are perpendicular to the immediate surroundings of the corresponding surface of the shaped body and/or the frame. The pin-like connections can be designed so that they bridge the distance between the frame and the shaped body in the shortest possible way. Thus, forces are optimally transferred into the frame, which absorbs the forces without significant deformation due to its annular closure. Frame and pin-like connections thus form an optimal stiffening framework.

Particular advantages are offered by the integral design of the shaped body and the frame surrounding the shaped body, also with respect to the occurrence of distortions in the form of heat treatments, because the frame surrounding the shaped body effectively protects the shaped body against distortion. The pin-type connections engaging at different positions form a comprehensive support structure and holding structure for the shaped body and thus prevent distortions in the shaped body in an efficient manner.

The pin-like connections can be distributed singly or in groups around the shaped body. In the case of a prism-shaped frame, an arrangement in groups means, for example, that a plurality of pin-like connections is formed on a common surface section of the shaped body and/or on a common inner wall section of the frame. Groups of pin-like connections along a circumference of the shaped body at different surface sections of the shaped body can thus be connected thereto. The group arrangement of pin-like connections brings an easily detachable, but at the same time particularly strong holding of the shaped body in the frame with it.

According to a further embodiment of the invention, it is provided that the pin-like connections are constructed on the inside of the frame. As a result, material consumption is small and the outer regions of the frame can be used for further shaped bodies.

The frame can have a variety of shapes in cross-section. A circular shape is thus possible, for example, with a view in the longitudinal direction of the sleeve in cross-section. However, other shapes are conceivable in cross-section. Thus, further embodiments of the invention in cross-section provide polygonal sleeves, for example, hexagonal or octagonal cross-sectional shapes, which have an increased stability.

According to a further embodiment of the invention, the solidification of the building material takes place within the provided contour through location-selective magnetic irradiation, for example, in the context of stereolithographic photopolymerization.

According to a further embodiment of the invention, the building material is a ceramic slurry.

The shaped body and the frame can be manufactured on a construction platform, for example, by the following process. Building material is conveyed between the construction platform and a transparent slice. The building material is location-selectively exposed through the slice in order to cure above the base slice within a specified contour. After a layer of the structure, that is, the integral unit of shaped body and frame, is solidified, the construction platform is successively raised relative to the base slice. Subsequently, building material is updated and the previous steps are continued until the structure is constructed by location-selective curing of the building material.

According to a further embodiment of the invention, the dimension of the shaped body in the axial direction of the sleeve-like frame substantially corresponds to the dimension of the frame. As a result, support of the shaped body can take place along its entire length.

According to a further embodiment of the invention, in addition to the pin-like connections, an additional support structure is constructed, for example, in the form of a cross support, which additionally supports the shaped body from below.

According to a further embodiment of the invention, a debinding and/or sintering is performed after the construction process of the frame and the shaped body. This is possible before the shaped body is released from the frame, wherein the frame protects the shaped body from distortions during heat treatment. Alternatively, a further embodiment of the invention provides that after the construction process, a common debinding of the frame and the shaped body takes place. In a further step, the shaped body is released from the frame and then sintered. This two-stage process, in which the shaped body is first presintered in the frame and the final crystallization takes place only on the shaped body itself, facilitates the removal of the pin-like connections and any additional support structure from the sintered shaped body. Associated tool wear is thereby reduced.

The distance between the frame and the shaped body is chosen such that the structures do not grow together, but rather are connected to each other only by the pin-like connections and possibly an additional support structure. It has proven to be advantageous when the distance between the frame and the shaped body is at least 1.4 mm, preferably at least 1.5 mm.

The frame thickness, that is, the thickness of the frame wall, can be at least 1.3 mm, which contributes to a low material consumption, but provides sufficient supporting forces.

A further embodiment of the invention provides that the shaped body is released from the frame in which the pin-like connections are separated from the shaped body. The pin-type connections eliminate the need to cut open or break the frame, which makes the entire manufacturing process more efficient. Thus, the shaped body can be released from the frame by exclusively breaking the pin-like connections and separating any additional support structure.

A further embodiment of the invention provides that an integral frame arrangement having a plurality of frames and arranged therein, in particular individual, shaped bodies is constructed during the construction process. The frame order can have the form of an array or a matrix in which a plurality of frames is arranged in a plane next to each other and each holding a shaped body. Since the frames are connected to each other, they support each other and contribute to a solid structure of the individual holdings for the individual shaped bodies. A plurality of shaped bodies each of individual shape can be produced simultaneously in a production process by providing the integrally formed frames.

In order to improve the simultaneous production of a plurality of shaped bodies, a further embodiment of the invention provides that the frame arrangement has a honeycomb structure, wherein adjacent frames preferably share a frame wall section. The honeycomb structure is generally considered to be an optimum shape with an ideal ratio of wall material to volume. At the same time, this shape stabilizes the overall construction.

A further embodiment of the invention provides that the frame arrangement has a plurality of frame arrangement planes stacked over each other within which a plurality of frames and shaped bodies are arranged, for example, in the form of a honeycomb structure. The juxtaposition and stacking of the frames significantly increase the production amount of shaped bodies produced. It is characteristic that several frames and shaped bodies are combined in one plane, for example, in a matrix arrangement with a view onto the plane. Further frames and shaped bodies are lined up in a second plane arranged parallel to this first plane, for example, in a matrix arrangement, so that the two planes are arranged stacked, that is, stack construction.

According to a further embodiment of the invention, adjacent frame arrangement planes, that is, the composite of a plurality of frames and shaped bodies, are spaced apart from each other and connected to each other by integrally formed webs or pin-like connections. The adjacent frame arrangement planes are thereby easily separable from each other by breaking these webs.

In principle, it is possible that together with the frame during the construction process on the frame, information carrier elements, such as numbers, QR codes or other markings are constructed, which serve to identify the individual shaped bodies.

According to a further embodiment of the invention, an additional support structure is constructed integrally with the frame and the shaped body during the construction process, which additionally secures the shaped body during the construction process and absorbs forces acting on the shaped body during the construction process. If, as described in WO 2010/045950 A1, the shaped body located in the construction process is repeatedly lowered and lifted out of the slurry along a travel axis, forces can act between the shaped body, the frame and the tank bottom and affect the structure of the entire construction object. In particular, after curing of a layer, when it is detached from the tank bottom during lifting of the construction platform, under certain circumstances, for example, when extended hardened areas adhere to the tank bottom, considerable tensile forces occur, which must be transferred from the construction platform via the frame to the shaped body located in the structure. These tensile forces can be effectively absorbed by the support structure. Preferably, the support structure is arranged along the travel axis of the construction platform between the side of the frame opposite the construction platform and the shaped body in order to absorb the tensile forces acting along the travel axis on the shaped body.

The method according to the invention has proven particularly advantageous in the field of dental technology. According to a further embodiment of the invention, it is therefore provided that the shaped body is a tooth replacement part, such as a tooth crown, an inlay, an onlay, a veneer, a bridge or a framework.

The accuracy of the surfaces is of particular importance, especially with dental products. In tooth replacement parts, such as crowns, the occlusal surfaces, but also the inner surface, which serves the connection to the tooth stump, are of particular importance. It is therefore advisable to make the connections between the shaped body and the frame at another location. Particularly suitable locations here are the oral or vestibular surfaces of the tooth replacement part, wherein the oral surfaces of the tooth replacement part are particularly preferred. These surfaces of the tooth replacement parts are ideally suited for the attachment of the support structure. Overall, this contributes to a high accuracy of the relevant surfaces, in particular the occlusal or the inner surface of the tooth replacement part.

BRIEF DESCRIPTION

Figure 1B:
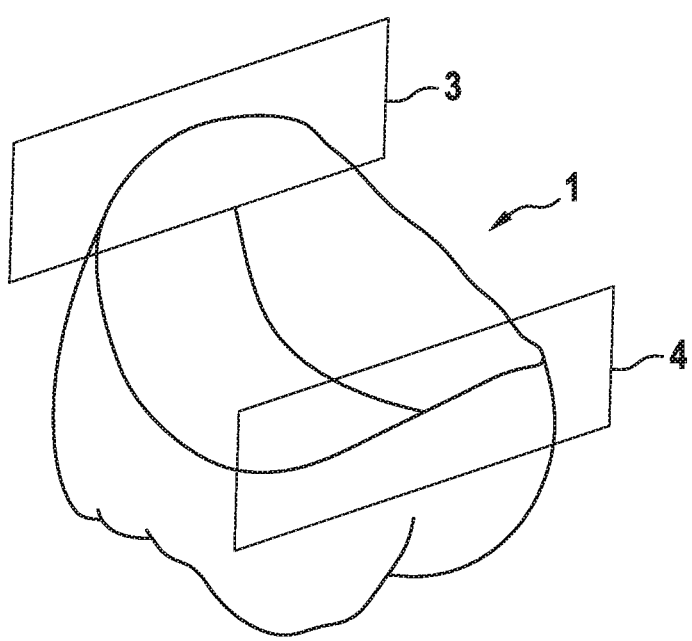
Figure 2A:
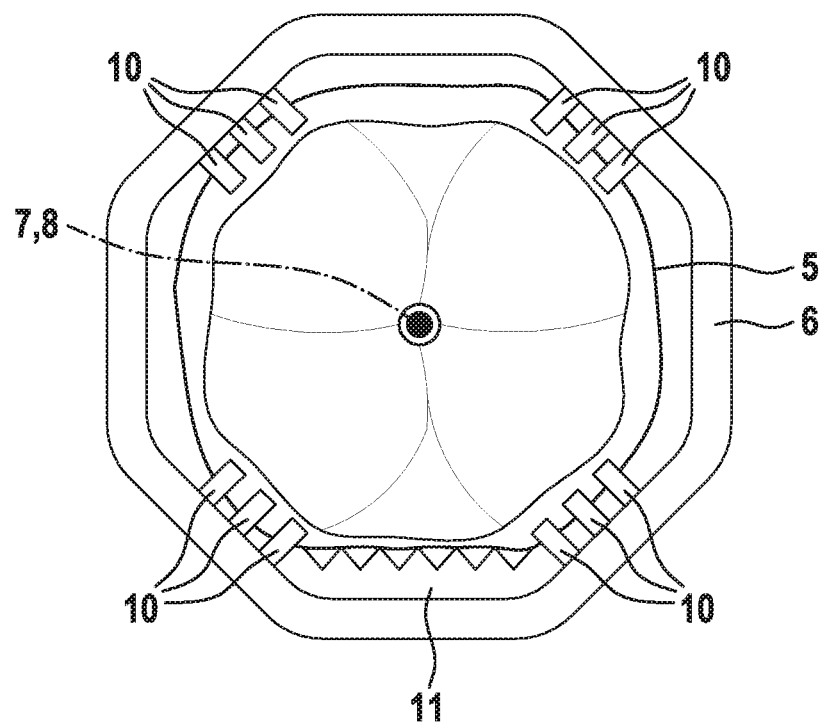
Figure 2B:
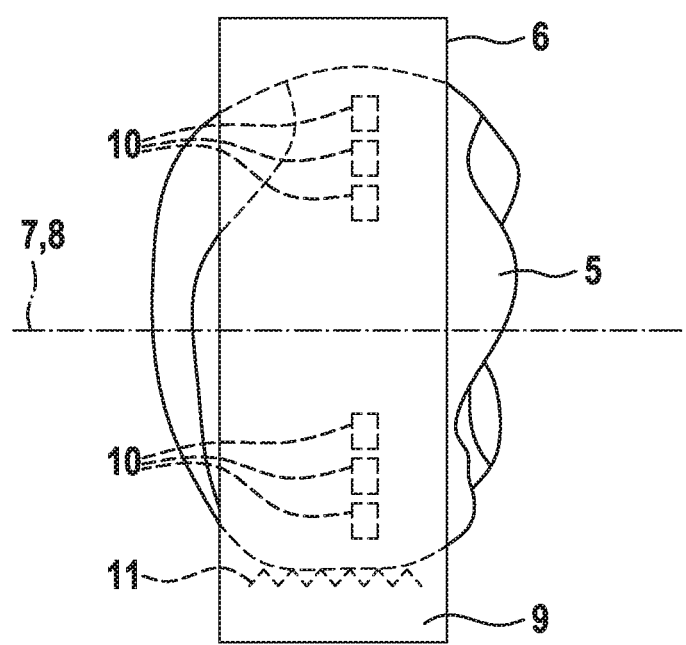
Figure 3:
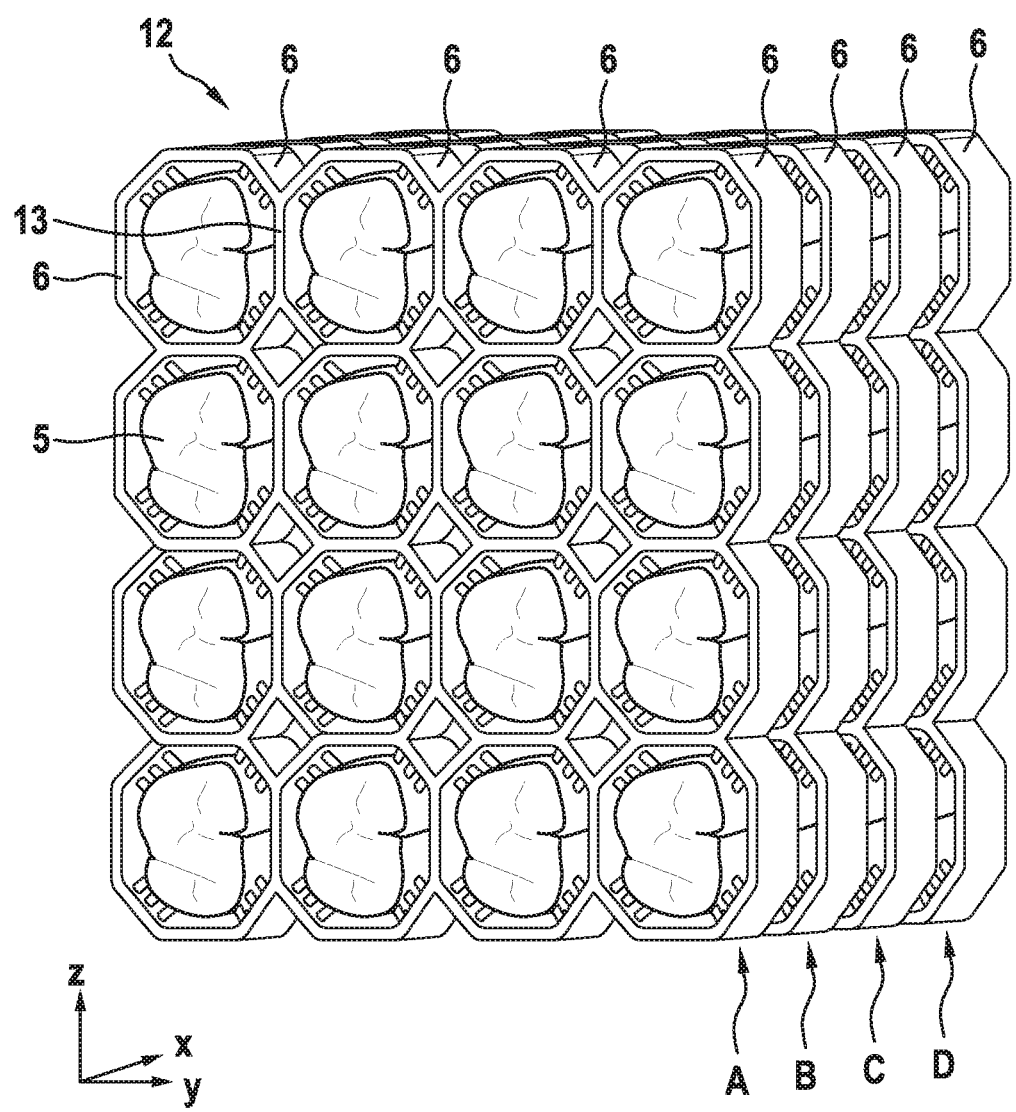

The present invention is explained in more detail below with reference to merely preferred exemplary embodiments and the drawings:

Shown are:

FIG. 1a in a side view, the digital template of a tooth crown on a support structure and in an oblique plan view of the manufactured tooth crown after sintering, FIG. 1b in a side view, the digital template of a tooth crown on a support structure and in an oblique plan view of the manufactured tooth crown after sintering, FIG. 2a a frame produced according to a first embodiment of the invention having a shaped body arranged therein, FIG. 2b a frame produced according to a first embodiment of the invention having a shaped body arranged therein, and FIG. 3 a frame arrangement produced according to a further embodiment of the invention.

DETAILED DESCRIPTION

FIG. 1a shows the digital template of a shaped body 1 in the form of a tooth crown on a support structure 2. Subsequently, this digital template is used to construct the shaped body 1 and the support structure 2 in layers by means of an additive manufacturing method in which slurry filled with ceramic is location-selectively cured. The tooth crown 1 is supported by the support structure 2 on the bumps of the occlusal surface of the tooth crown. The support structure 2 causes stiffening of the crown 1 during the production process in which sintering takes place. The support structure 2 is removed after the production of the crown.

FIG. 1b shows the tooth crown 1 after manufacture. Framed here are the regions 3 and 4, which are face away from the arrangement of the support structure 2. Comparatively large distortions occur in these regions during the sintering process.

FIGS. 2a and 2b show a shaped body and a frame which are produced integrally according to a first embodiment of the invention. During the construction process, that is, integrally with the shaped body (tooth crown), the sleeve-like frame 6 surrounding the shaped body 5 at a distance was constructed in layers from the building material. The sleeve-like frame 6 extends in the axial direction 7 and along its longitudinal axis 8. The side wall 9 of the frame 6 extends around the axes 7 and 8. The representation in FIG. 2a is a plan view of the chewing surface of the tooth crown along the axes 7 and 8. FIG. 2b shows the frame 6 and the crown 5 arranged therein in a side view.

In cross-section, that is, seen in the direction of the longitudinal axis 8, the frame has a polygonal shape, here in the form of an octagon. This shape gives the frame 6 additional stability. The side wall 9 extends around the circumference of the shaped body 5 about the axis 7. Pin-shaped connections 10 formed integrally with the frame and the shaped body were constructed during the construction process on the inner wall of the side wall 9 of the frame 6. These are seen in the axial direction 7 distributed around the shaped body periphery and connect the shaped body to the frame. The connections 10 serve in particular as distortion avoidance structures and prevent distortion of the shaped body during heat treatment measures.

In addition to the connections 10, a supporting structure 11 below the shaped body 5 is also constructed integrally with the shaped body and the frame 6. The construction object, that is, the entirety of frame 6, shaped body 5, connections 10 and support structure 11, has been constructed during the construction process on a construction platform, not shown, which lies in FIG. 2a on the outside of the lower frame wall, on the inside of which the support body 11 is located. A corresponding method, in which the construction object located in the structure on the construction platform is repeatedly dipped into the slurry and raised again and thus constructed in layers starting from the construction platform, has been described in the introduction with reference to WO 2010/045950 A1. The tensile forces acting on the shaped body 5 during the construction process are absorbed by the supporting structure 11 and are effectively absorbed by this and transmitted to the construction platform via the frame.

In the axial direction 7, the dimension of the shaped body 5, that is, the length over which the shaped body 5 extends in the axial direction 7, substantially corresponds to the dimension of the frame 6 in the axial direction 7. The pin-like connections are distributed in groups of three pin-like connections over the circumference of the shaped body 5, here substantially at a distance of about 90°. Other angular distances (for example, 45°, 60°, 120°) are also possible. However, it is crucial that the pin-like connections engage at different sections of the circumference of the shaped body in order to ensure an efficient fixation of the shaped body 5 in the manufacturing process. The thickness of the pin-like connections 10 is chosen so that they are easy to break, whereby the shaped body 5 can be released out of the frame 6 in a simple manner.

FIG. 3 shows a plurality of frames 6, which are combined in the manner of an array or in a matrix arrangement in a plane A (Z-Y) and respectively hold a shaped body 5 of individual shape. This frame arrangement 12 has a honeycomb structure in the plane A. Adjacent frames 6 share a common frame wall section 13 within this honeycomb structure of the plane A. In the X-direction behind the first frame arrangement plane A, a further frame arrangement plane B is constructed, which, like the frame arrangement plane A, consists of a plurality of matrix arrangement frames in honeycomb structure with shaped bodies arranged therein. The planes A and B are spaced apart from each other, which means that a shaped body of the plane A is not directly connected to the shaped body of the plane B located behind. In fact, the two planes A and B are connected to each other only via webs (not shown) integrally formed with the frame arrangement planes A and B, that is, frames lying one behind the other in the X direction are not directly connected to each other. These webs are formed so as to be easily broken, whereby the planes A/B can be easily separated from each other. Plane B is followed by further planes C/D, which are analogous to planes A/B.

LIST OF REFERENCE NUMBERS 1 tooth crown
2 support structure
3 region having special tendency to distortion
4 region having special tendency to distortion
5 shaped body
6 frame
7 axial direction
8 longitudinal axis
9 sidewall of the frame
10 connections
11 support structure
12 frame arrangement
13 common frame wall section
A 1. frame arrangement plane
B 2. frame arrangement plane
C 3. frame arrangement plane
D 4. frame arrangement plane

The invention claimed is:

1. A method for producing shaped bodies (5) from a building material by a construction process comprising
successively solidifying layers of the building material through the action of electromagnetic radiation in a layer area having a contour specified for a respective layer to produce a layered structure of a shaped body (5), wherein together with the shaped body (5), a frame (6) is constructed layer by layer from the building material, wherein the frame (6) is constructed in the form of a sleeve defining a longitudinal axis, wherein the frame includes a circumferential frame wall that is extended along the longitudinal axis and surrounds the shaped body at a distance, wherein the layer-wise construction of the shaped body takes place on a construction platform, wherein the shaped body and the frame are constructed layer by layer so that the longitudinal axis of the shaped body and the sleeve is oriented transverse to the direction of the layer by layer build-up and a lower outside surface section of the circumferential frame wall faces the construction platform, wherein a plurality of pin connections (10) is constructed integral with the frame (6) and the shaped body (5), which are distributed around the shaped body (5) and which connect the shaped body (5) with the frame (6), wherein the building material contains photopolymerizable polymer precursor compounds and filler, wherein after the construction process, a debinding of the frame (6) and of the shaped body (5) takes place, and wherein, in a further step, the shaped body (5) is released from the frame (6) and subsequently is sintered.

2. The method according to claim 1 wherein the construction process comprises an additive manufacturing method, and wherein the building material comprises slurry filled with ceramic.

3. The method according to claim 1, wherein the pin connections (10) are constructed on the inside of the frame (6).

4. The method according to claim 1, wherein the solidification of the building material takes place within the specified contour by location-selective electromagnetic radiation.

5. The method according to claim 1, wherein the building material is a ceramic slurry.

6. The method according to claim 1, wherein the dimension of the shaped body (5) substantially corresponds to the dimension of the frame (6) in an axial direction (7) of the frame (6).

7. The method according to claim 1, wherein after the construction process, a debinding and/or sintering is performed.

8. The method according to claim 1, wherein the shaped body (5) is released from the frame (6) by separating the pin connections (10) from the shaped body (5).

9. The method according to claim 1, wherein an integral frame arrangement (12) having a plurality of frames (6) and shaped bodies (5) arranged therein are constructed during the construction process.

10. The method according to claim 9, wherein the frame arrangement (12) has a honeycomb structure, wherein adjacent frames (6) share a frame wall section (13).

11. The method according to one of claim 9, wherein the frame arrangement (12) comprises a plurality of frame arrangement planes (A, B, C, D) stacked over each other, within each of which a plurality of frames (6) and shaped bodies (5) are arranged.

12. The method according to claim 11, wherein adjacent frame arrangement planes (A, B, C, D) are spaced from each other and connected to each other by integrally formed webs so that adjacent frame arrangement planes (A, B, C, D) are separable from each other by breaking the webs.

13. The method according to claim 1, wherein the shaped body (5) is a tooth replacement part.

14. The method according to claim 13, wherein the pin connections (10) which connect the tooth replacement part (5) to the frame (6) are constructed on the oral or vestibular surfaces of the tooth replacement part (5).

15. The method according to claim 1, wherein integral with the frame (6) and the shaped body (5), an additional support structure (11) is constructed between the side of the frame (6) opposite the construction platform and the shaped body (5) in order to absorb forces acting on the shaped body (5) during the construction process.

16. The method according to claim 13, wherein the tooth replacement part comprises a tooth crown.

17. A method for producing shaped bodies (5) from a building material by a construction process comprising successively solidifying layers of the building material through the action of electromagnetic radiation in a layer area having a contour specified for a respective layer to produce a layered structure of a shaped body (5), wherein together with the shaped body (5), a frame (6) is constructed layer by layer from the building material, wherein the frame (6) is constructed in the form of a sleeve defining a longitudinal axis, wherein the frame includes a circumferential frame wall that is extended along the longitudinal axis and surrounds the shaped body at a distance, wherein the layer-wise construction of the shaped body takes place on a construction platform, wherein the shaped body and the frame are constructed layer by layer so that the longitudinal axis of the sleeve is oriented transverse to the direction of the layer by layer build-up and a lower outside surface section of the circumferential frame wall faces the construction platform, wherein a plurality of pin connections (10) is constructed integral with the frame (6) and the shaped body (5), which are distributed around the shaped body (5) and which connect the shaped body (5) with the frame (6), wherein the building material contains photopolymerizable polymer precursor compounds and filler, wherein after the construction process, a debinding of the frame (6) and of the shaped body (5) takes place, and wherein, in a further step, the shaped body (5) is released from the frame (6) and subsequently is sintered.

* * * * *